(12) United States Patent
Liu

(10) Patent No.: US 11,388,652 B2
(45) Date of Patent: Jul. 12, 2022

(54) METHOD AND APPARATUS FOR INDICATING POSITION OF CELL-DEFINING SYNCHRONIZATION SIGNAL BLOCK AND SEARCHING FOR THE SAME, AND BASE STATION

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 20 days.

(21) Appl. No.: 17/023,077

(22) Filed: Sep. 16, 2020

(65) Prior Publication Data

US 2021/0022069 A1    Jan. 21, 2021

Related U.S. Application Data

(63) Continuation of application No. PCT/CN2018/080967, filed on Mar. 28, 2018.

(30) Foreign Application Priority Data

Mar. 16, 2018    (WO) ................ PCT/CN2018/079331

(51) Int. Cl.
*H04W 48/10* (2009.01)
*H04J 11/00* (2006.01)
*H04W 56/00* (2009.01)

(52) U.S. Cl.
CPC ......... *H04W 48/10* (2013.01); *H04J 11/0073* (2013.01); *H04J 11/0076* (2013.01); *H04J 11/0086* (2013.01); *H04W 56/001* (2013.01)

(58) Field of Classification Search
CPC ... H04W 48/10; H04W 56/001; H04W 48/12; H04W 56/00; H04J 11/0073; H04J 11/0076; H04J 11/0086
See application file for complete search history.

(56) References Cited

U.S. PATENT DOCUMENTS

2017/0094624 A1    3/2017    Balachandran et al.
2018/0146465 A1    5/2018    Li et al.
(Continued)

FOREIGN PATENT DOCUMENTS

CN    102461280 A    5/2012
CN    106793058 A    5/2017
(Continued)

OTHER PUBLICATIONS

Extended European Search Report Issued in Application No. 18909930.2, dated Apr. 16, 2021, (9p).
(Continued)

*Primary Examiner* — Hashim S Bhatti
(74) *Attorney, Agent, or Firm* — Arch & Lake LLP

(57) ABSTRACT

A method of indicating a position of a cell-defining SSB includes: acquiring on-off indication information set in a physical broadcast channel (PBCH) of a non-cell-defining SSB, where the on-off indication information is a first value or a second value. In response to that the on-off indication information is the first value, the base station sets SSB position indication information in the PBCH to indicate a position of a raster or a raster group in which a cell-defining SSB is located. In response to that the on-off indication information is the second value, the base station sets gap indication information in the PBCH to indicate that there is no cell-defining SSB within a range of a current frequency band. The range has a length of a gap value and is centered at a position of the current SSB; and sending the SSB to user equipment (UE).

20 Claims, 9 Drawing Sheets

(56) References Cited

U.S. PATENT DOCUMENTS

| | | | | |
|---|---|---|---|---|
| 2018/0337755 | A1* | 11/2018 | John Wilson | H04L 27/2675 |
| 2021/0058879 | A1* | 2/2021 | Geng | H04W 72/042 |
| 2021/0368551 | A1* | 11/2021 | Xiong | H04W 72/042 |

FOREIGN PATENT DOCUMENTS

| | | |
|---|---|---|
| WO | 2017004774 A1 | 1/2017 |
| WO | 2017150889 A1 | 9/2017 |
| WO | 2017217719 A1 | 12/2017 |
| WO | 2018048187 A1 | 3/2018 |

OTHER PUBLICATIONS

ISA State Intellectual Property Office of the People's Republic of China, Written Opinion of the International Searching Authority Issued in Application No. PCT/CN2018/079331, dated Nov. 29, 2018, WIPO, (9p).

ISA State Intellectual Property Office of the People's Republic of China, Written Opinion of the International Searching Authority Issued in Application No. PCT/CN2018/080967, dated Dec. 5, 2018, WIPO, (9p).

Qualcomm Incorporated: "Remaining details on NR-PBCH",3GPPTSG RAN WG1 Meeting 90bis Prague, Oct. 9-13, 2017; R1-1718527, (7p).

International Search Report Issued in PCT Application No. PCT/CN2018/080967, dated Dec. 5, 2018 with English translation, (6p).

International Search Report issued in PCT Application No. PCT/CN2018/079331, dated Nov. 29, 2018, with English translation, (4p).

MediaTek Inc.,"SS block transmissions in wideband carrier", 3GPP TSG RAN WG1 Meeting 91,Reno, USA, R1-1719556, Nov. 27-Dec. 1, 2017, (3p).

OPPO,"Remaining details on SS block transmissions", 3GPP TSG RAN WG1 Meeting 91,Reno, USA,R1-1720853, Oct. 27-Nov. 1, 2017, (3p).

LG Electronics, "Remaining Details on Synchronization signal",3GPP TSG RAN WG1 Meeting AH 1801,Vancouver, Canada, R1-1800349, Jan. 22-26, 2018, (7p).

Intel Corporation,"On SSB based intra-frequency cell identification requirement for NR", 3GPP TSG-RAN4 Meeting #85,Reno, Nevada, US, R4-1712366, Nov. 27-Dec. 1, 2017, (4p).

First Office Action issued to Chinese Application No. 20188000283.6 dated Jun. 26, 2019 with English translation, (10p).

Intellectual property India, Office Action Issued in Application No. 202047044225, dated Sep. 23, 2021, 6 pages. (Submitted with Partial Machine Translation).

* cited by examiner

METHOD AND APPARATUS FOR INDICATING POSITION OF CELL-DEFINING SYNCHRONIZATION SIGNAL BLOCK AND SEARCHING FOR THE SAME, AND BASE STATION

CROSS-REFERENCE TO RELATED APPLICATION

This application is a continuation of International Application No. PCT/CN2018/080967, filed on Mar. 28, 2018, which claims priority to International Application No. PCT/CN2018/079331, filed on Mar. 16, 2018, the disclosures of which are incorporated herein by reference in their entireties for all purposes.

TECHNICAL FIELD

The present disclosure relates to the field of communication technology, and in particular, relates to a method and an apparatus for indicating a position of a cell-defining synchronization signal block (SSB) and searching for the same, a base station, user equipment, and a computer-readable storage medium.

BACKGROUND

With the rapid development of wireless communication technology, the fifth generation mobile communication technology (5th Generation, 5G for short) has emerged. In a recent discussion of 3rd Generation Partnership Project (3GPP), non-cell-defining SSB is introduced for measurement, which, however, brings a new problem. In particular, for user equipment (UE) during an initial access, it starts a decoding process even if finding a non-cell-defining SSB first and thus wastes time on searching until know that the SSB is not a cell-defining SSB from the decoding process. With similar events happening in every frequency band, the UE is confronted with a very poor performance of initial searching.

SUMMARY

In view of the above, according to embodiments of this application, a method and an apparatus for indicating a position of a cell-defining SSB and searching for the same, a base station, UE, and a computer-readable storage medium are provided, so as to reduce the searching time for SSB no matter whether two frequency bands of an operator are separated by one frequency band of another operator or not.

According to a first aspect of the present disclosure, a method of indicating a position of a cell-defining SSB is provided, which is applicable to a base station. The method may include: acquiring on-off indication information set in a physical broadcast channel (PBCH) of a non-cell-defining SSB, wherein the on-off indication information is a first value or a second value; setting, in response to that the on-off indication information is the first value, SSB position indication information in the PBCH to indicate a position of a raster or a raster group in which a cell-defining SSB is located; setting, in response to that the on-off indication information is the second value, gap indication information in the PBCH to indicate that there is no cell-defining SSB within a range of a current frequency band, where the range has a length of a gap value and is centered at a position of the current SSB; and sending the SSB to UE.

According to a second aspect of the present disclosure, a method of searching for a position of a cell-defining SSB is provided, which is applicable to UE. The method may include: receiving an SSB sent by a base station; parsing the SSB; reading, in response to that on-off indication information parsed from a PBCH of the SSB is a first value, SSB position indication information and searching for a position of a cell-defining SSB based on the SSB position indication information; and reading, in response to that the on-off indication information parsed from the PBCH of the SSB is a second value, gap indication information and searching for the position of the cell-defining SSB by skipping a range of a current frequency band indicated by the gap indication information, where the range has a length of a gap value and is centered at a position of the current SSB.

According to a third aspect of the present disclosure, an apparatus for indicating a position of a cell-defining SSB is provided, which is applicable to a base station. The apparatus may include: an acquiring module configured to acquire on-off indication information set in a PBCH of a non-cell-defining SSB, where the on-off indication information is a first value or a second value; a first setting module configured to set, in response to that the on-off indication information acquired by the acquiring module is the first value, SSB position indication information in the PBCH to indicate a position of a raster or a raster group in which a cell-defining SSB is located; a second setting module configured to set, in response to that the on-off indication information acquired by the acquiring module is the second value, gap indication information in the PBCH to indicate that there is no cell-defining SSB within a range of a current frequency band, where the range has a length of a gap value and is centered at a position of the current SSB; and a sending module configured to send the SSB having the SSB position indication information set by the first setting module or the gap indication information set by the second setting module, to UE.

According to a fourth aspect of the present disclosure, an apparatus for searching for a position of a cell-defining SSB is provided, which is applicable to UE. The apparatus may include: a receiving module configured to receive an SSB sent by a base station; a parsing module configured to parse the SSB received by the receiving module; a first reading and searching module configured to read, in response to that on-off indication information parsed from a PBCH of the SSB by the parsing module is a first value, SSB position indication information and search for a position of a cell-defining SSB based on the SSB position indication information; and a second reading and searching module configured to read, in response to that the on-off indication information parsed from the PBCH of the SSB by the parsing module is a second value, gap indication information and search for the position of the cell-defining SSB by skipping a range of a current frequency band indicated by the gap indication information, where the range has a length of a gap value and is centered at a position of the current SSB.

According to a fifth aspect of the present disclosure, a base station is provided, including: a processor; and a memory for storing executable instructions by the processor. The processor may be configured to: acquire on-off indication information set in a PBCH of a non-cell-defining SSB, where the on-off indication information is a first value or a second value; set, in response to that the on-off indication information is the first value, SSB position indication information in the PBCH to indicate a position of a raster or a raster group in which a cell-defining SSB is located; set, in response to that the on-off indication information is the second value, gap indication information in the PBCH to indicate that there is no cell-defining SSB within a range of a current frequency band, where the range has a length of a gap value and is centered at a position of the current SSB; and send the SSB to UE.

According to a sixth aspect of the present disclosure, UE is provided, including: a processor; and a memory for storing executable instructions by the processor. The processor may be configured to: receive an SSB sent by a base station; parse the SSB; read, in response to that on-off indication information parsed from a PBCH of the SSB is a first value, SSB position indication information and search for a position of a cell-defining SSB based on the SSB position indication information; and read, in response to that the on-off indication information parsed from the PBCH of the SSB is a second value, gap indication information and search for the position of the cell-defining SSB by skipping a range of a current frequency band indicated by the gap indication information, where the range has a length of a gap value and is centered at a position of the current SSB.

According to a seventh aspect of the present disclosure, a computer-readable storage medium is provided, the storage medium storing computer instructions that, when executed by a processor, cause the processor to implement the above methods of indicating a position of a cell-defining SSB.

According to an eighth aspect of the present disclosure, a computer-readable storage medium is provided, the storage medium storing computer instructions that, when executed by a processor, cause the processor to implement the above methods of searching for a position of a cell-defining SSB.

It should be understood that the above general description and the following detailed description are only exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
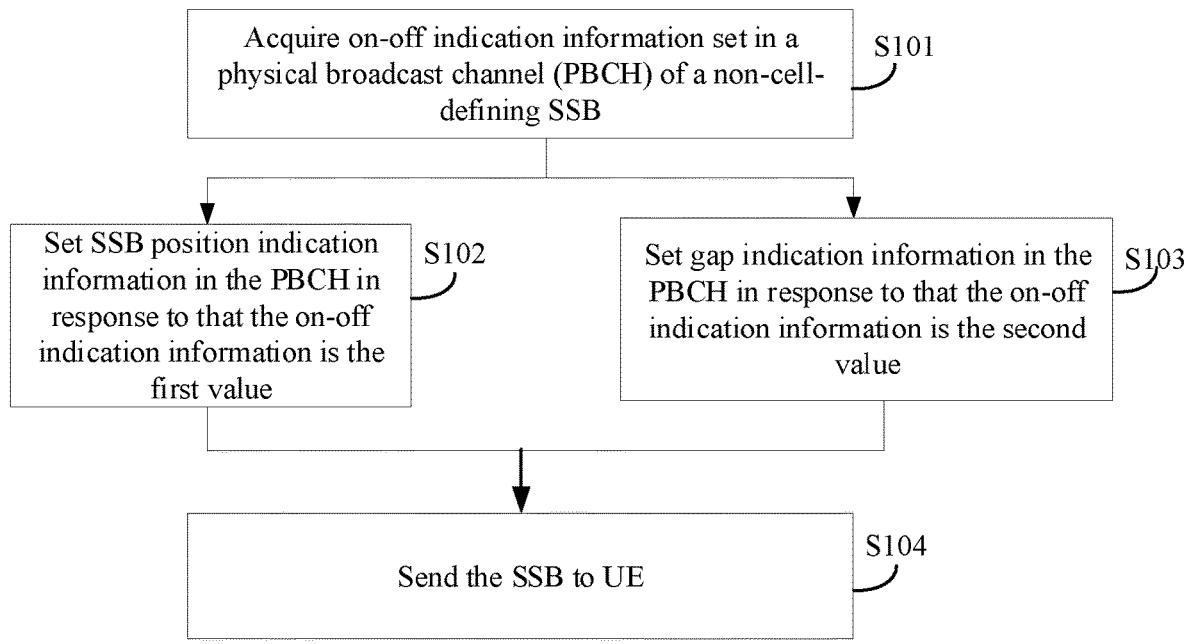
FIG. 1 is a flowchart illustrating a method of indicating a position of a cell-defining SSB according to an example of the present application.

Exemplary embodiments will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for describing particular embodiments only, and are not intended to limit the present disclosure. The singular forms "a/an", "the" and "this" used in the present disclosure and the appended claims are also intended to include the plural forms unless the context clearly indicates other meanings. It is to be understood that the term "and/or" as used herein refers to and includes any or all possible combinations of one or more associated listed items.

It is to be understood that although the terms first, second, third, etc. may be used to describe various information in the present disclosure, the information should not be limited to these terms. The terms are only used to distinguish the same type of information from each other. For example, without departing from the scope of the present disclosure, the first information may also be referred to as second information, and similarly, the second information may also be referred to as first information. Depending on the context, the word "if" as used herein may be interpreted as "during" or "when" or "in response to determining."

FIG. 1 is a flowchart illustrating a method of indicating a position of a cell-defining SSB according to an example of the present application, which is described from a base station side. As shown in FIG. 1, the method of indicating a position of a cell-defining SSB includes the following steps.

At step S101, on-off indication information set in a PBCH of a non-cell-defining SSB is acquired. The on-off indication information may be a first value or a second value.

The SSB refers to a synchronization signal block or a physical broadcast channel block. A cell-defining SSB refers to an SSB with indicating a control channel time-frequency position of a corresponding RMSI. A non-cell-defining SSB refers to an SSB without indicating the control channel time-frequency position of a corresponding RMSI.

Figure 2A:
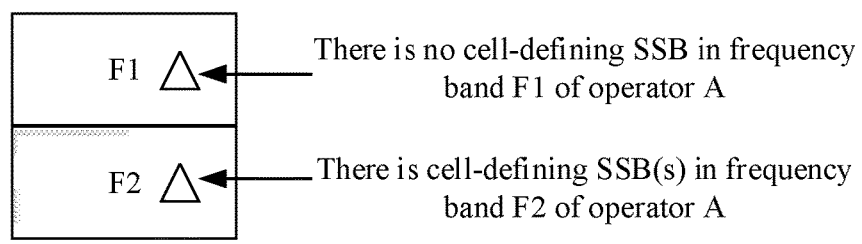
FIG. 2A is a schematic diagram illustrating scenario 1 according to an example of the present application.
Figure 2B:
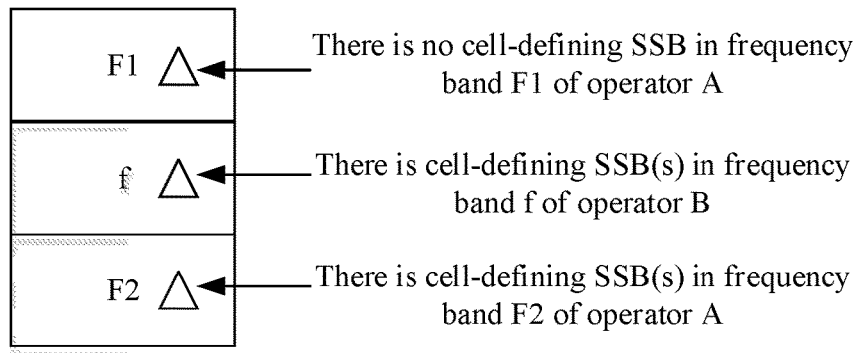
FIG. 2B is a schematic diagram illustrating scenario 2 according to an example of the present application.

In the example, the on-off indication information is to distinguish two scenarios by taking the first value or the second value. In scenario 1, two frequency bands of an operator are not separated by one frequency band of another operator. As shown in FIG. 2A, frequency band F1 and frequency band F2, both of which are owned by operator A, are contiguous, that is, there is no frequency band of another operator between them. Moreover, there is no cell-defining SSB in frequency band F1, and there is cell-defining SSB(s) in frequency band F2. In scenario 2, two frequency bands of an operator are separated by one frequency band of another operator, and there is cell-defining SSB(s) in the frequency band of another operator. As shown in FIG. 2B, frequency band F1 and frequency band F2 which both are owned by operator A are separated by a frequency band of another operator, that is frequency band f of operator B. Moreover, there is no cell-defining SSB in frequency band F1, there is cell-defining SSB(s) in frequency band F2 and in frequency band f.

The first value and the second value can be set in terms of requirement. For example, the first value can be 1, and the second value can be 0.

At step S102, SSB position indication information is set in the PBCH in response to that the on-off indication information is the first value. The SSB position indication information indicates a position of a raster or a raster group in which a cell-defining SSB is located.

In the PBCH, there are a first preset number of redundant bits and a second preset number of frequency offset reserved bits. The first preset number may be 8, and the second preset number may also be 8.

In the example, a first number of bits can be selected from the first preset number of bits of the PBCH, a second number of frequency offset reserved bits can be selected from the second preset number of frequency offset reserved bits of the PBCH, and the SSB position indication information can be set with the first number of bits and the second number of frequency offset reserved bits.

For example, 5 bits can be selected from the 8 bits of the PBCH, 6 frequency offset reserved bits can be selected from the 8 frequency offset reserved bits of the PBCH, and the SSB position indication information can be set with the 5 bits and the 6 frequency offset reserved bits. Assuming that the SSB position indication information is set with the 5 bits and the 6 frequency offset reserved bits, up to 192 SSB positions can be set, that is, up to 96 SSB positions can be set in both positive and negative directions.

Optionally, the method may further include: grouping SSBs. For example, the SSBs whose raster distances to each other are less than a preset distance may constitute one group.

At present, for rasters corresponding to SSBs, a maximum number of their positions in new radio (NR) frequency bands is less than 640, and for every three rasters, as a feature, their distances to each other are closer than to others. With this feature, the SSBs whose raster distances to each other are less than the preset distance may constitute one group, that is, every three SSBs that are close to each other constitute one group.

If the SSBs are not grouped, the SSB position indication information indicates the position of the raster in which the cell-defining SSB is located. If the SSBs have been grouped, the SSB position indication information can indicate the position of the raster group in which the cell-defining SSB is located.

At step S103, gap indication information is set in the PBCH in response to that the on-off indication information is the second value. The gap indication information indicates that there is no cell-defining SSB within a range of a current frequency band, in which the range has a length of a gap value and is centered at a position of the current SSB.

In the example, a third number of bits can be selected from the first preset number of bits of the PBCH, a fourth number of frequency offset reserved bits can be selected from the second preset number of frequency offset reserved bits of the PBCH, and the gap value can be set with the third number of bits and the fourth number of frequency offset reserved bits.

For example, 3 bits can be selected from the 8 bits of the PBCH, 2 frequency offset reserved bits can be selected from the 8 frequency offset reserved bits of the PBCH, and the gap value can be set with the 3 bits and the 2 frequency offset reserved bits. Assuming that the gap value is set with the 3 bits and the 2 frequency offset reserved bits, up to 16 units of the gap value can be set, that is, up to 8 units of the gap value can be set in both positive and negative directions. The unit may be n physical resource blocks (PRBs) and n may be defined separately based on the bandwidth of each frequency band.

Optionally, the method may further include that, a content of SCS information of the RMSI is reset in the PBCH. The reset SCS information of the RMSI indicates the SCS of the cell-defining SSB.

Since SCS information exists in a PBCH of an SSB and indicates an SCS of RMSI, and a non-cell-defining SSB is not followed by RMSI, the content of the SCS information can be reset to indicate an SCS of a cell-defining SSB.

In the example, by resetting the content of the SCS information of the RMSI in the PBCH, the UE can accordingly determine the SCS of the cell-defining SSB, thereby reducing the time for determining the SCS of the cell-defining SSB.

At step S104, the SSB is sent to the UE.

In response to setting the SSB position indication information and the gap indication information in the PBCH of the non-cell-defining SSB, SSBs including the non-cell-defining SSB may be sent to the UE.

In some examples, by acquiring the on-off indication information set in the PBCH of the non-cell-defining SSB, and setting the SSB position indication information in the PBCH in response to that the on-off indication information is the first value, the UE can search for the position of the cell-defining SSB based on the SSB position indication information, thereby reducing the searching time. By setting the gap indication information in the PBCH in response to that the on-off indication information is the second value, the UE can search for the position of the cell-defining SSB by skipping the range of the current frequency band indicated by the gap indication information with the range having the length of the gap value and being centered at the position of the current SSB, that is, the UE can search for the position of the cell-defining SSB by skipping a set frequency band, thereby reducing the searching time.

Figure 3:
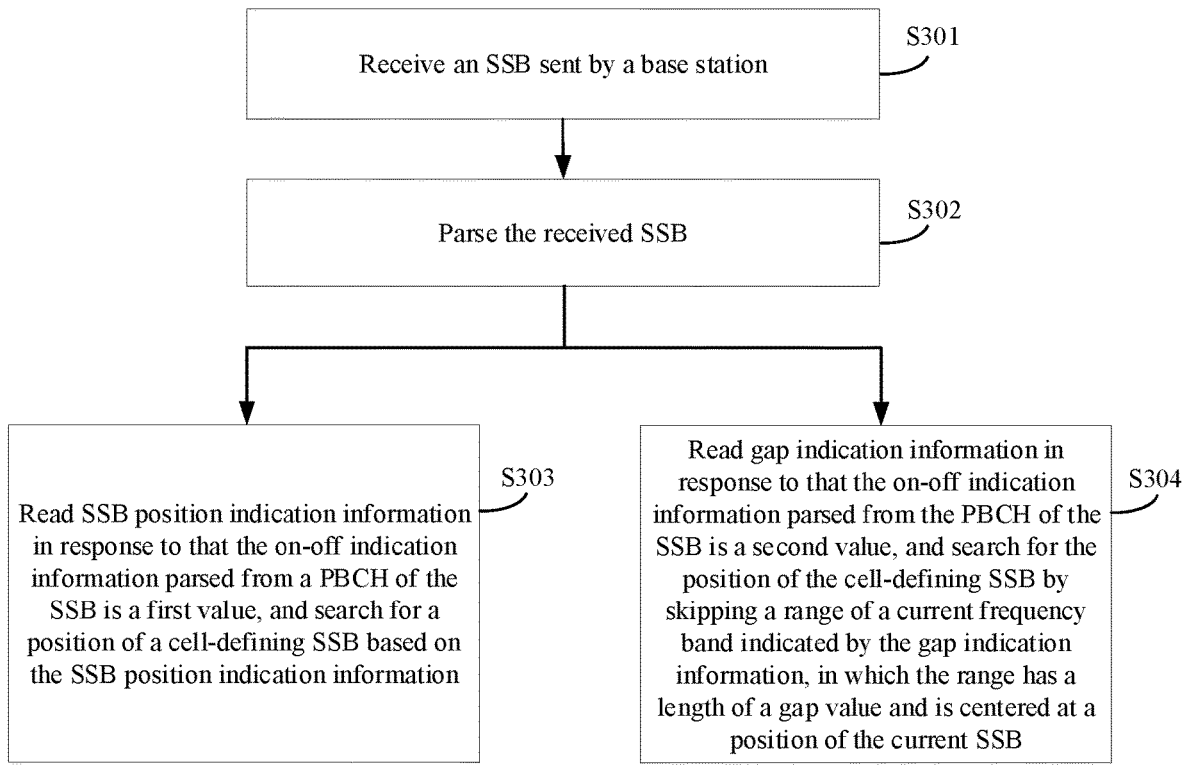
FIG. 3 is a flowchart illustrating a method of searching for a position of a cell-defining SSB according to an example of the present application.

FIG. 3 is a flowchart illustrating a method of searching for a position of a cell-defining SSB according to an example of the present application, which is described from UE side. The method includes the following steps.

At step S301, an SSB sent by a base station is received.

At step S302, the received SSB is parsed.

At step S303, SSB position indication information is read in response to that the on-off indication information parsed from a PBCH of the SSB is a first value, and a position of a cell-defining SSB is searched for based on the SSB position indication information.

In the example, the SSB position indication information can be read from a first number of bits and a second number of frequency offset reserved bits of the PBCH.

Optionally, the method may further include: grouping SSBs. For example, the SSBs whose raster distances to each other are less than a preset distance may constitute one group.

At present, for rasters corresponding to SSBs, a maximum number of their positions in new radio (NR) frequency bands is less than 640, and for every three rasters, as a feature, their distances to each other are closer than to others. With this feature, SSBs whose raster distances to each other are less than the preset distance may constitute one group, that is, every three SSBs that are close to each other constitute one group.

In response to that the SSB position indication information indicates a position of a raster in which the cell-defining SSB is located, the UE may search for the position of the cell-defining SSB within a preset range based on the position of the raster in which the cell-defining SSB is located. In response to that the SSB position indication information indicates a position of a raster group in which the cell-defining SSB is located, the UE may search for the position of the cell-defining SSB within the preset range based on the position of the raster group in which the cell-defining SSB is located.

The preset range can be set in terms of requirement. For example, it can be [−10K, +10K].

At step S304, gap indication information is read in response to that the on-off indication information parsed from the PBCH of the SSB is a second value, and the position of the cell-defining SSB is searched for by skipping a range of a current frequency band indicated by the gap indication information, in which the range has a length of a gap value and is centered at a position of the current SSB.

The gap indication information can be read from a third number of bits and a fourth number of frequency offset reserved bits of the PBCH. In response to reading the gap indication information, the UE searches for the position of the cell-defining SSB by skipping the range of the current frequency band indicated by the gap indication information with the range having the length of the gap value and being centered at the position of the current SSB, that is, the position of the cell-defining SSB is searched for by skipping a set frequency band, thereby reducing the searching time.

Optionally, the method may further include that, in response to that reset SCS information of RMSI is parsed from the PBCH of the SSB, an SCS of the cell-defining SSB may be determined based on the reset SCS information of the RMSI. The reset SCS information of the RMSI indicates the SCS of the cell-defining SSB.

In the example, by determining the SCS of the cell-defining SSB based on the reset SCS information of the RMSI, the time for determining the SCS of the cell-defining SSB is reduced.

In some examples, in response to that the on-off indication information parsed from the PBCH of the SSB is the first value, the SSB position indication information is read and the position of the cell-defining SSB is searched for based on the SSB position indication information, thereby reducing the searching time. In response to that the on-off instruction information parsed from the PBCH of the SSB is the second value, the gap indication information is read, and the position of the cell-defining SSB is searched for by skipping the range of the current frequency band indicated by the gap indication information with the range having the length of the gap value and being centered at the position of the current SSB, that is, the position of the cell-defining SSB is searched for by skipping the set frequency band, thereby reducing the searching time.

Figure 4:
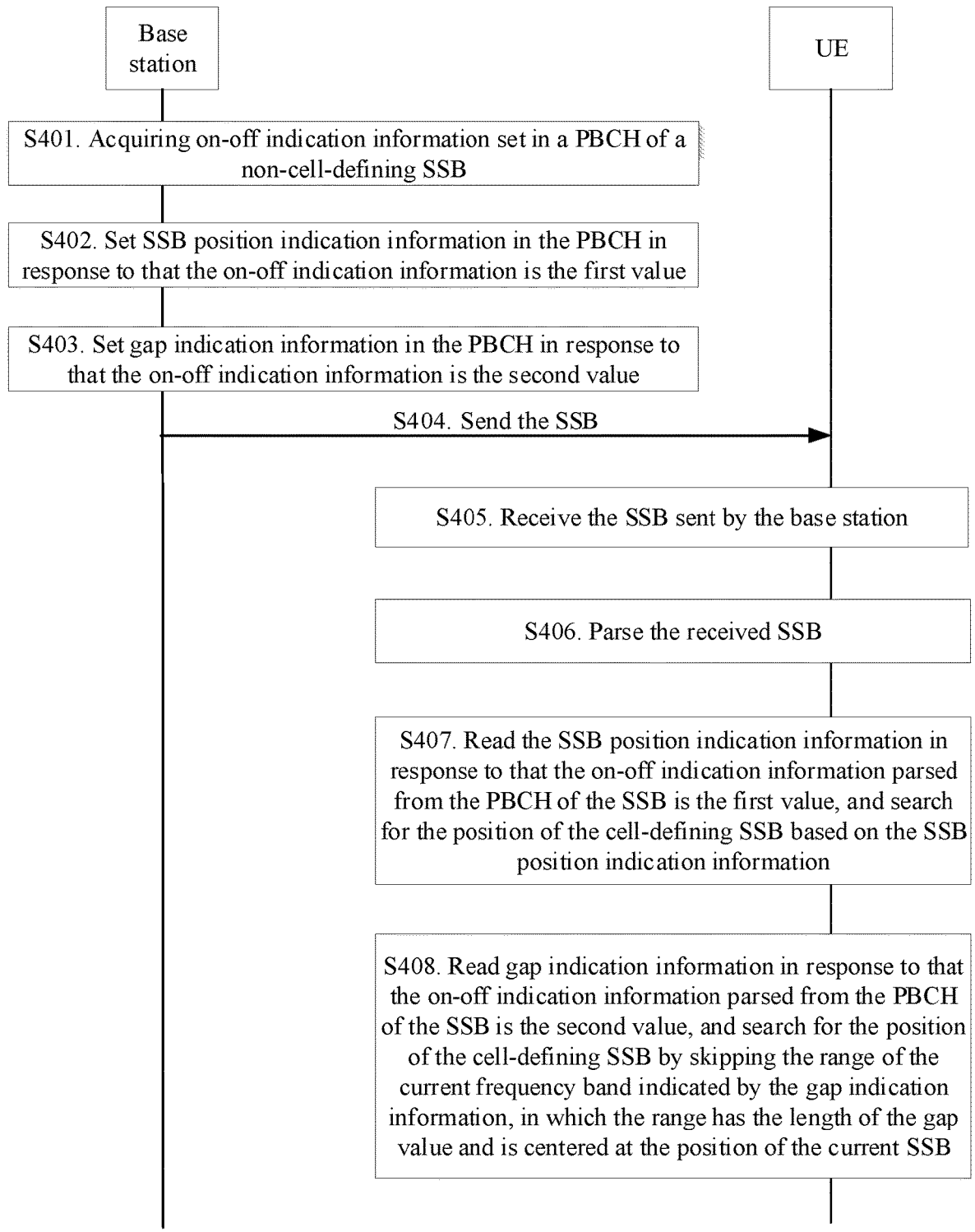
FIG. 4 is a signal flowchart illustrating a method of searching for a position of a cell-defining SSB according to an example of the present application.

FIG. 4 is a signal flowchart illustrating a method of searching for a position of a cell-defining SSB according to an example of the present application, which is described from the perspective of interaction between a base station and UE. As shown in FIG. 4, the method includes the following steps.

At step S401, on-off indication information set in a PBCH of a non-cell-defining SSB is acquired by a base station. The on-off indication information is a first value or a second value.

At step S402, SSB position indication information is set by the base station in the PBCH in response to that the on-off indication information is the first value. The SSB position indication information indicates a position of a cell-defining SSB.

The position of the cell-defining SSB may include, but is not limited to, a position of a raster group in which the cell-defining SSB is located.

At step S403, gap indication information is set by the base station in the PBCH in response to that the on-off indication information is the second value. The gap indication information indicates that there is no cell-defining SSB within a range of a current frequency band, in which the range has a length of a gap value and is centered at a position of the current SSB.

At step S404, the SSB is sent to UE by the base station.

At step S405, the SSB sent by the base station is received by the UE.

At step S406, the received SSB is parsed by the UE.

At step S407, the SSB position indication information is read in response to that the on-off indication information parsed from the PBCH of the SSB is the first value, and the position of the cell-defining SSB is searched for based on the SSB position indication information.

At step S408, the gap indication information is read in response to that the on-off indication information parsed from the PBCH of the SSB is the second value, the position of the cell-defining SSB is searched for by skipping the range of the current frequency band indicated by the gap indication information, in which the range has the length of the gap value and is centered at the position of the current SSB.

In some examples, through the interaction between the base station and the UE, the UE can search for the position of the cell-defining SSB based on the SSB position indication information, thereby reducing the searching time. Meanwhile, the UE can search for the position of the cell-defining SSB by skipping the range of the current frequency band indicated by the gap indication information with the range having the length of the gap value and being centered at the position of the current SSB, that is, the UE can search for the position of the cell-defining SSB by skipping a set frequency band, thereby reducing the searching time.

Figure 5:
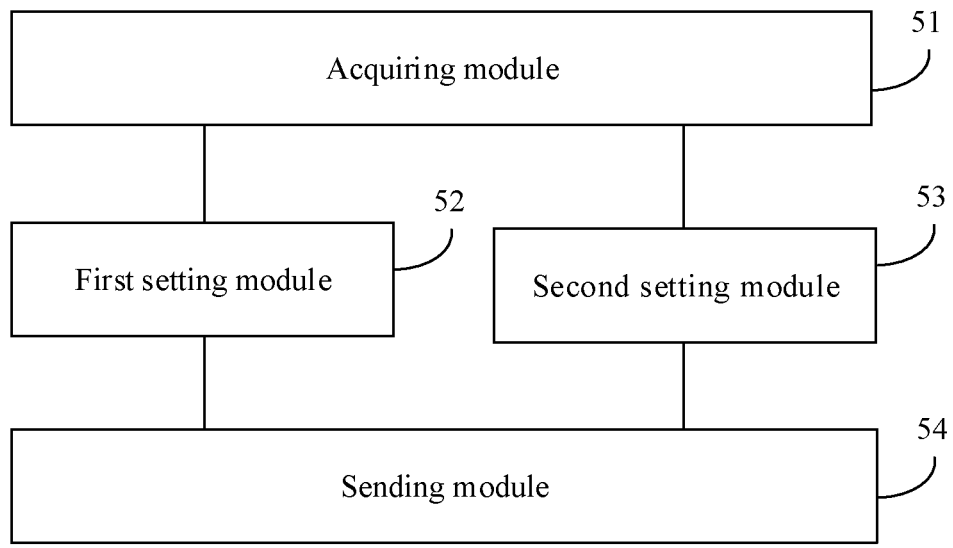
FIG. 5 is a block diagram illustrating an apparatus for indicating a position of a cell-defining SSB according to an example.

FIG. 5 is a block diagram illustrating an apparatus for indicating a position of a cell-defining SSB based on an example, which may be located in a base station. As shown in FIG. 5, the apparatus includes: an acquiring module 51, a first setting module 52, a second setting module 53 and a sending module 54.

The acquiring module 51 is configured to acquire on-off indication information set in a PBCH of a non-cell-defining SSB. The on-off indication information may be a first value or a second value.

The SSB refers to a synchronization signal block or a physical broadcast channel block. A cell-defining SSB refers to an SSB with indicating a control channel time-frequency position of a corresponding RMSI. A non-cell-defining SSB refers to an SSB without indicating the control channel time-frequency position of a corresponding RMSI.

In the example, the on-off indication information is to distinguish two scenarios by taking the first value or the second value. In scenario 1, two frequency bands of an operator are not separated by one frequency band of another operator. As shown in FIG. 2A, frequency band F1 and frequency band F2, both of which are owned by operator A, are contiguous, that is, there is no frequency band of another operator between them. Moreover, there is no cell-defining SSB in frequency band F1, and there is cell-defining SSB(s) in frequency band F2. In scenario 2, two frequency bands of an operator are separated by one frequency band of another operator, and there is cell-defining SSB(s) in the frequency band of another operator. As shown in FIG. 2B, frequency band F1 and frequency band F2 which both are owned by operator A are separated by a frequency band of another operator, that is frequency band f of operator B. Moreover, there is no cell-defining SSB in frequency band F1, there is cell-defining SSB(s) in frequency band F2 and in frequency band f.

The first value and the second value can be set in terms of requirement. For example, the first value can be 1, and the second value can be 0.

The first setting module 52 is configured to set SSB position indication information in the PBCH in response to that the on-off indication information determined by the acquiring module 51 is the first value. The SSB position indication information indicates a position of a raster or a raster group in which a cell-defining SSB is located.

In the PBCH, there are a first preset number of redundant bits and a second preset number of frequency offset reserved bits. The first preset number may be 8, and the second preset number may also be 8.

In the example, a first number of bits can be selected from the first preset number of bits of the PBCH, a second number of frequency offset reserved bits can be selected from the second preset number of frequency offset reserved bits of the PBCH, and the SSB position indication information can be set with the first number of bits and the second number of frequency offset reserved bits.

For example, 5 bits can be selected from the 8 bits of the PBCH, 6 frequency offset reserved bits can be selected from the 8 frequency offset reserved bits of the PBCH, and the SSB position indication information can be set with the 5 bits and the 6 frequency offset reserved bits. Assuming that the SSB position indication information is set with the 5 bits and the 6 frequency offset reserved bits, up to 192 SSB positions can be set, that is, up to 96 SSB positions can be set in both positive and negative directions.

Optionally, the apparatus may further include: a grouping module (not shown in FIG. 5). The grouping module is configured to group SSBs, for example, the SSBs whose raster distances to each other are less than a preset distance may constitute one group.

At present, for rasters corresponding to SSBs, a maximum number of their positions in new radio (NR) frequency bands is less than 640, and for every three rasters, as a feature, their distances to each other are closer than to others. With this feature, the SSBs whose raster distances to each other less than the preset distance may constitute one group, that is, every three SSBs that are close to each other constitute one group.

If the SSBs are not grouped, the SSB position indication information indicates the position of the raster in which the cell-defining SSB is located. If the SSBs have been grouped, the SSB position indication information can indicate the position of the raster group in which the cell-defining SSB is located.

The second setting module 53 is configured to set gap indication information in the PBCH in response to that the on-off indication information determined by the acquiring module 51 is the second value. The gap indication information indicates that there is no cell-defining SSB within a range of a current frequency band, in which the range has a length of a gap value and is centered at a position of the current SSB.

In the example, a third number of bits can be selected from the first preset number of bits of the PBCH, a fourth number of frequency offset reserved bits can be selected from the second preset number of frequency offset reserved bits of the PBCH, and the gap value can be set with the third number of bits and the fourth number of frequency offset reserved bits.

For example, 3 bits can be selected from the 8 bits of the PBCH, 2 frequency offset reserved bits can be selected from the 8 frequency offset reserved bits of the PBCH, and the gap value can be set with the 3 bits and the 2 frequency offset reserved bits. Assuming that the gap value is set with the 3 bits and the 2 frequency offset reserved bits, up to 16 units of the gap value can be set, that is, up to 8 units of the gap value can be set in both positive and negative directions. The unit may be n physical resource blocks (PRBs) and n may be defined separately based on the bandwidth of each frequency band.

The sending module 54 is configured to send the SSB having the SSB position indication information set by the first setting module 52 or the gap indication information set by the second setting module 53 to UE.

In response to setting the SSB position indication information and the gap indication information in the PBCH of the non-cell-defining SSB, SSBs including the non-cell-defining SSB may be sent to the UE.

In some examples, by acquiring the on-off indication information set in the PBCH of the non-cell-defining SSB, and setting the SSB position indication information in the PBCH in response to that the on-off indication information is the first value, the UE can search for the position of the cell-defining SSB based on the SSB position indication information, thereby reducing the searching time. By setting the gap indication information in the PBCH in response to that the on-off indication information is the second value, the UE can search for the position of the cell-defining SSB by skipping the range of the current frequency band indicated by the gap indication information with the range having the length of the gap value and being centered at the position of the current SSB, that is, the UE can search for the position of the cell-defining SSB by skipping a set frequency band, thereby reducing the searching time.

Figure 6:
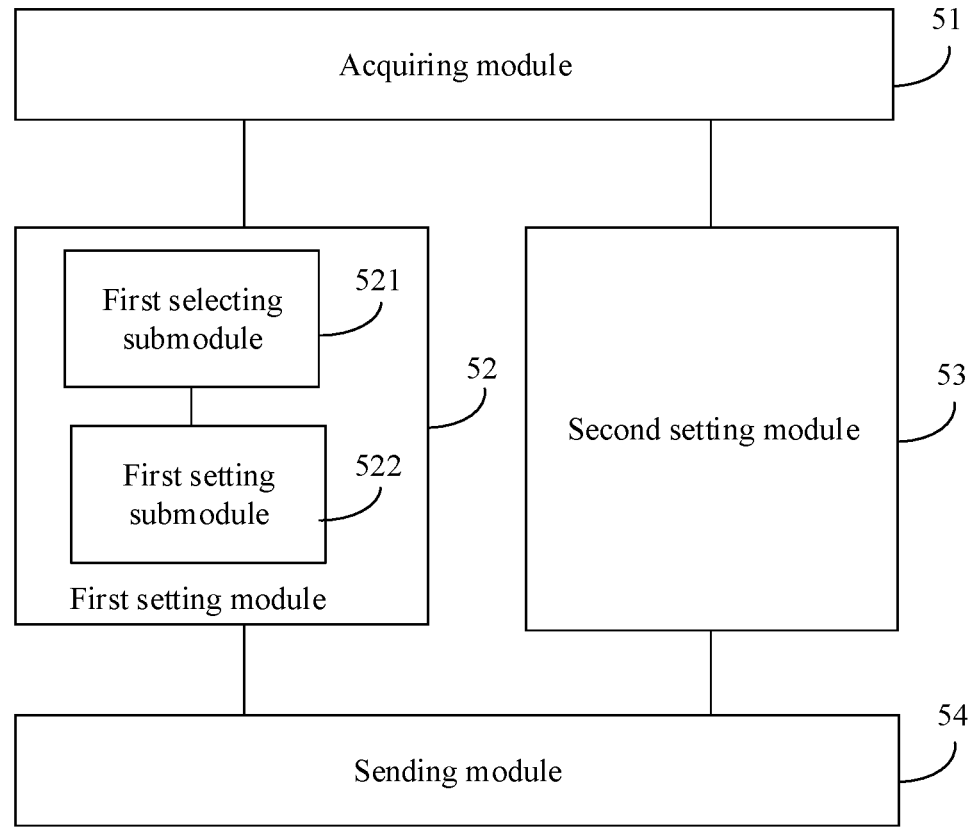
FIG. 6 is a block diagram illustrating another apparatus for indicating a position of a cell-defining SSB according to an example.

FIG. 6 is a block diagram illustrating another apparatus for indicating a position of a cell-defining SSB according to an example. As shown in FIG. 6, on the basis of the example shown in FIG. 5, the first setting module 52 may include: a first selecting submodule 521 and a first setting submodule 522.

The first selecting submodule 521 is configured to select the first number of bits from the first preset number of bits of the PBCH, and select the second number of frequency offset reserved bits from the second preset number of frequency offset reserved bits of the PBCH.

The first setting submodule 522 is configured to set the SSB position indication information with the first number of bits and the second number of frequency offset reserved bits selected by the first selecting submodule 521.

In the PBCH, there are the first preset number of redundant bits and the second preset number of frequency offset reserved bits. The first preset number may be 8, and the second preset number may also be 8.

In the example, the first number of bits can be selected from the first preset number of bits of the PBCH, the second number of frequency offset reserved bits can be selected from the second preset number of frequency offset reserved bits of the PBCH, and the SSB position indication information can be set with the first number of bits and the second number of frequency offset reserved bits.

For example, 5 bits can be selected from the 8 bits of the PBCH, 6 frequency offset reserved bits can be selected from the 8 frequency offset reserved bits of the PBCH, and the SSB position indication information can be set with the 5 bits and the 6 frequency offset reserved bits. Assuming that the SSB position indication information is set with the 5 bits and the 6 frequency offset reserved bits, up to 192 SSB positions can be set, that is, up to 96 SSB positions can be set in both positive and negative directions.

In some examples, the selected first number of bits and the selected second number of frequency offset reserved bits are utilized to set the SSB position indication information, which is simple to implement and provides basis for a follow-up process which makes the UE save the searching time.

Figure 7:
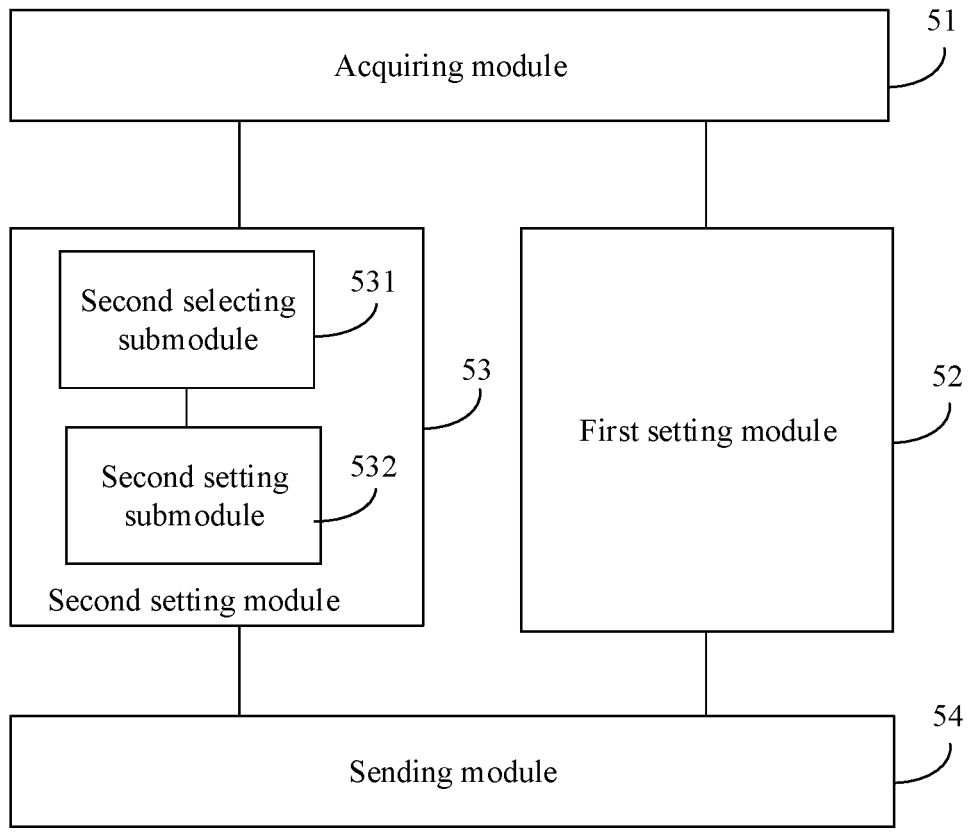
FIG. 7 is a block diagram illustrating another apparatus for indicating a position of a cell-defining SSB according to an example.

FIG. 7 is a block diagram illustrating another apparatus for indicating a position of a cell-defining SSB according to an example. As shown in FIG. 7, on the basis of the example shown in FIG. 5, the second setting module includes: a second selecting submodule 531 and a second setting submodule 532.

The second selecting submodule 531 is configured to select the third number of bits from the first preset number of bits of the PBCH, and select the fourth number of frequency offset reserved bits from the second preset number of frequency offset reserved bits of the PBCH.

The second setting submodule 532 is configured to set the gap value with the third number of bits and the fourth number of frequency offset reserved bits selected by the second selecting submodule 531.

In the example, the third number of bits can be selected from the first preset number of bits of the PBCH, the fourth number of frequency offset reserved bits can be selected from the second preset number of frequency offset reserved bits of the PBCH, and the gap value can be set with the third number of bits and the fourth number of frequency offset reserved bits.

For example, 3 bits can be selected from the 8 bits of the PBCH, 2 frequency offset reserved bits can be selected from the 8 frequency offset reserved bits of the PBCH, and the gap value can be set with the 3 bits and the 2 frequency offset reserved bits. Assuming that the gap value is set with the 3 bits and the 2 frequency offset reserved bits, up to 16 units of the gap value can be set, that is, up to 8 units of the gap value can be set in both positive and negative directions. The unit may be n physical resource blocks (PRBs) and n may be defined separately based on the bandwidth of each frequency band.

In some examples, the selected third number of bits and the selected fourth number of frequency offset reserved bits are utilized to set the gap value, which is simple to implement and provides basis for a follow-up process which makes the UE save the searching time.

Figure 8A:
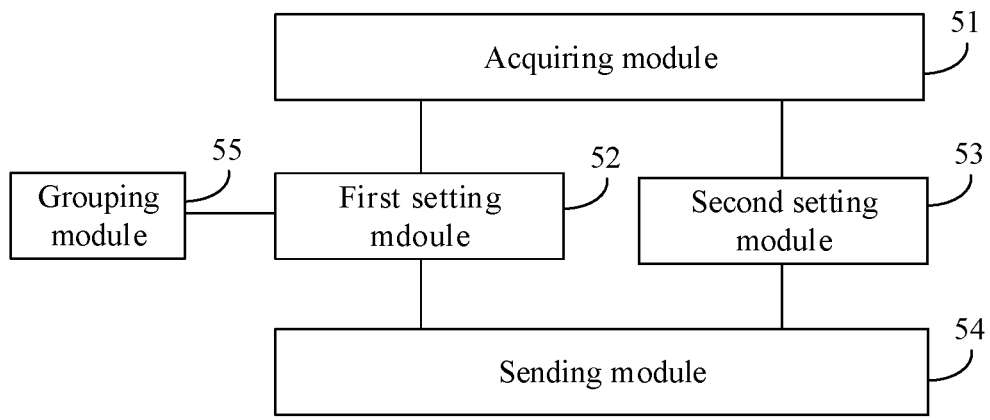
FIG. 8A is a block diagram illustrating another apparatus for indicating a position of a cell-defining SSB according to an example.

FIG. 8A is a block diagram illustrating another apparatus for indicating a position of a cell-defining SSB according to an example. As shown in FIG. 8A, on the basis of the example shown in FIG. 5, the apparatus further includes: a grouping module 55.

The grouping module 55 is configured to group SSBs.

For example, the SSBs whose raster distances to each other are less than a preset distance may constitute one group.

At present, for rasters corresponding to SSBs, a maximum number of their positions in new radio (NR) frequency bands is less than 640, and for every three rasters, as a feature, their distances to each other are closer than to others. With this feature, the SSBs whose raster distances to each other are less than the preset distance may constitute one group, that is, every three SSBs that are close to each other constitute one group.

In some examples, by grouping SSBs, there is provided basis for a follow-up process which indicates the SSB position indication information.

Figure 8B:
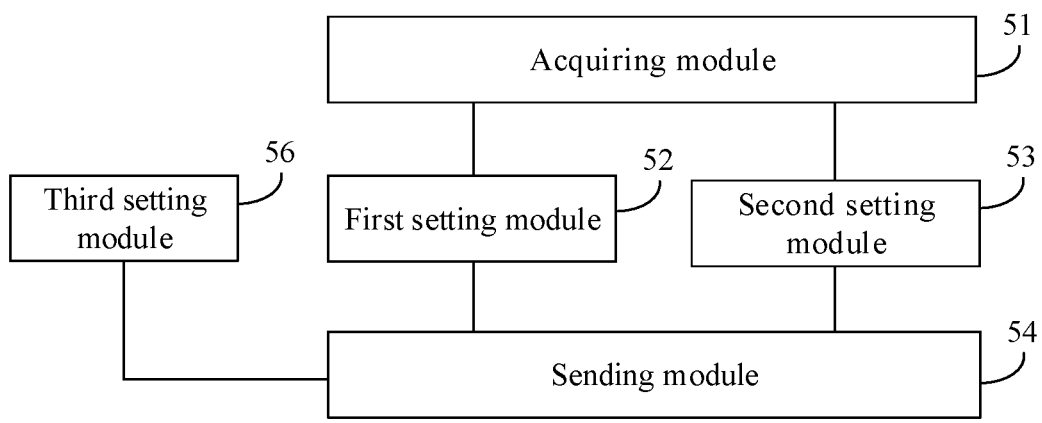
FIG. 8B is a block diagram illustrating another apparatus for indicating a position of a cell-defining SSB according to an example.

FIG. 8B is a block diagram illustrating another apparatus for indicating a position of a cell-defining SSB according to an example. As shown in FIG. 8B, on the basis of the example shown in FIG. 5, the apparatus further includes: a third setting module 56.

The third setting module 56 is configured to reset a content of SCS information of the RMSI in the PBCH. The reset SCS information of the RMSI indicates an SCS of the cell-defining SSB.

The sending module 54 is further configured to send the SSB having the SCS information of the RMSI reset by the third setting module 56 to the UE.

In some examples, by resetting the content of the SCS information of the RMSI in the PBCH, the UE can accordingly determine the SCS of the cell-defining SSB, thereby reducing the time for determining the SCS of the cell-defining SSB.

Figure 9:
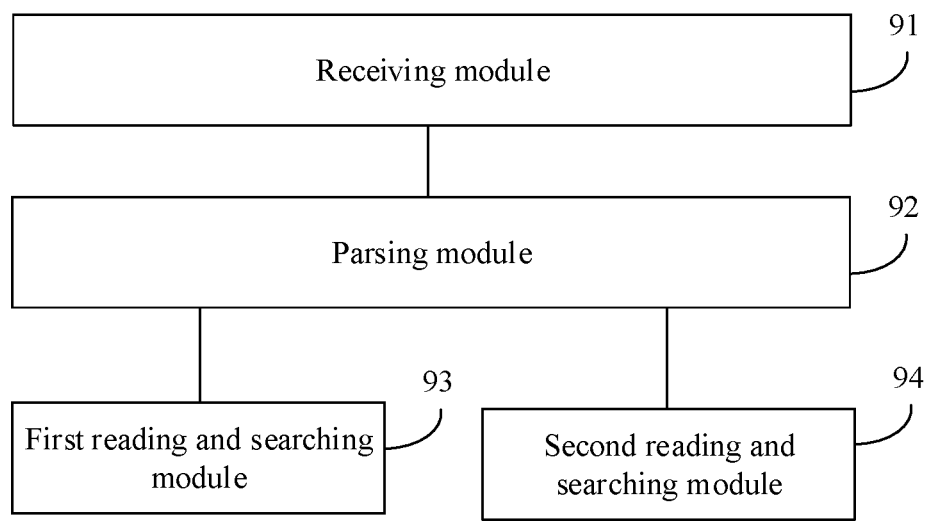
FIG. 9 is a block diagram illustrating an apparatus for searching for a position of a cell-defining SSB according to an example.

FIG. 9 is a block diagram illustrating an apparatus for searching for a position of a cell-defining SSB according to an example, which may be located in UE. As shown in FIG. 9, the apparatus includes: a receiving module 91, a parsing module 92, a first reading and searching module 93, and a second reading and searching module 94.

The receiving module 91 is configured to receive an SSB sent by a base station.

The parsing module 92 is configured to parse the SSB received by the receiving module 91.

The first reading and searching module 93 is configured to read SSB position indication information in response to that the on-off indication information parsed from a PBCH of the SSB by the parsing module 92 is a first value, and search for a position of a cell-defining SSB based on the SSB position indication information.

In the example, the first reading and searching module 93 may read the SSB position indication information from a first number of bits and a second number of frequency offset reserved bits of the PBCH.

In response to that the SSB position indication information indicates a position of a raster in which the cell-defining SSB is located, the first reading and searching module 93 may search for the position of the cell-defining SSB within a preset range based on the position of the raster in which the cell-defining SSB is located. In response to that the SSB position indication information indicates a position of a raster group in which the cell-defining SSB is located, the first reading and searching module 93 may search for the position of the cell-defining SSB within the preset range based on the position of the raster group in which the cell-defining SSB is located.

The preset range can be set in terms of requirement. For example, it can be [−10K, +10K].

The second reading and searching module 94 is configured to read gap indication information in response to that the on-off indication information parsed from the PBCH of the SSB by the parsing module 92 is a second value, search for the position of the cell-defining SSB by skipping a range of a current frequency band indicated by the gap indication information, in which the range has a length of a gap value and is centered at a position of the current SSB.

The second reading and searching module 94 may read the gap indication information from a third number of bits and a fourth number of frequency offset reserved bits of the PBCH.

In some examples, in response to that the on-off indication information parsed from the PBCH of the SSB is the first value, the SSB position indication information is read and the position of the cell-defining SSB is searched for based on the SSB position indication information, thereby reducing the searching time. In response to that the on-off instruction information parsed from the PBCH of the SSB is the second value, the gap indication information is read, and the position of the cell-defining SSB is searched for by skipping the range of the current frequency band indicated by the gap indication information with the range having the length of the gap value and being centered at the position of the current SSB, that is, the position of the cell-defining SSB is searched for by skipping a set frequency band, thereby reducing the searching time.

Figure 10A:
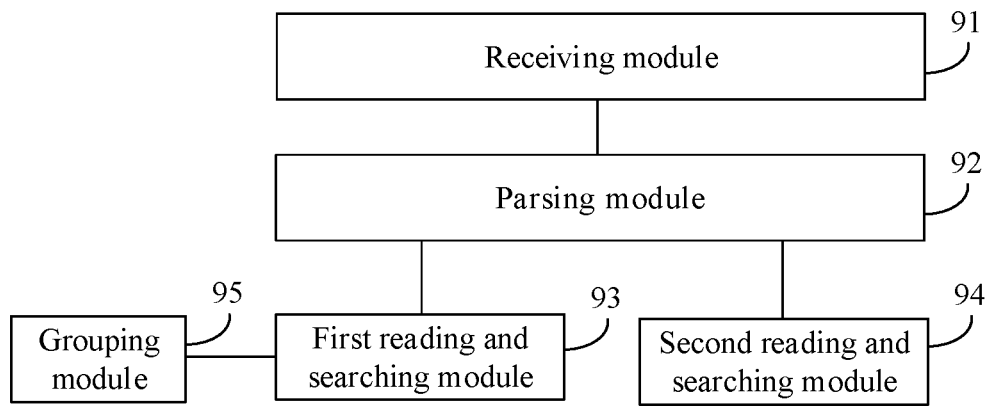
FIG. 10A is a block diagram illustrating another apparatus for searching for a position of a cell-defining SSB according to an example.

FIG. 10A is a block diagram illustrating another apparatus for searching for a position of a cell-defining SSB according to an example. As shown in FIG. 10A, on the basis of the example shown in FIG. 9, the apparatus may further include: a grouping module 95.

The grouping module 95 is configured to group SSBs.

For example, the SSBs whose raster distances to each other are less than a preset distance may constitute one group.

At present, for rasters corresponding to SSBs, a maximum number of their positions in new radio (NR) frequency bands is less than 640, and for every three rasters, as a feature, their distances to each other are closer than to others. With this feature, the SSBs whose raster distances to each other are less than the preset distance may constitute one group, that is, every three SSBs that are close to each other constitute one group.

In some examples, by grouping SSBs, there is provided basis for a follow-up process which searches for the position of the cell-defining SSB based on the SSB position indication information.

Figure 10B:
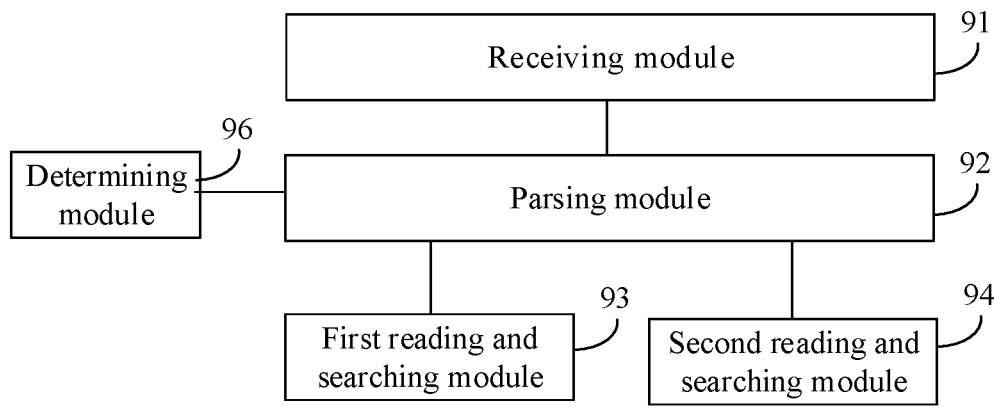
FIG. 10B is a block diagram illustrating another apparatus for searching for a position of a cell-defining SSB according to an example.

FIG. 10B is a block diagram illustrating another apparatus for searching for a position of a cell-defining SSB according to an example. As shown in FIG. 10B, on the basis of the example shown in FIG. 9, the apparatus may further include: a determining module 96.

The determining module 96 is configured to, in response to that reset SCS information of RMSI is parsed from the PBCH of the SSB by the parsing module 92, determine an SCS of the cell-defining SSB based on the reset SCS information of the RMSI. The reset SCS information of the RMSI indicates the SCS of the cell-defining SSB.

In some examples, by determining the SCS of the cell-defining SSB based on the reset SCS information of the RMSI, the time for determining the SCS of the cell-defining SSB is reduced.

Figure 11:
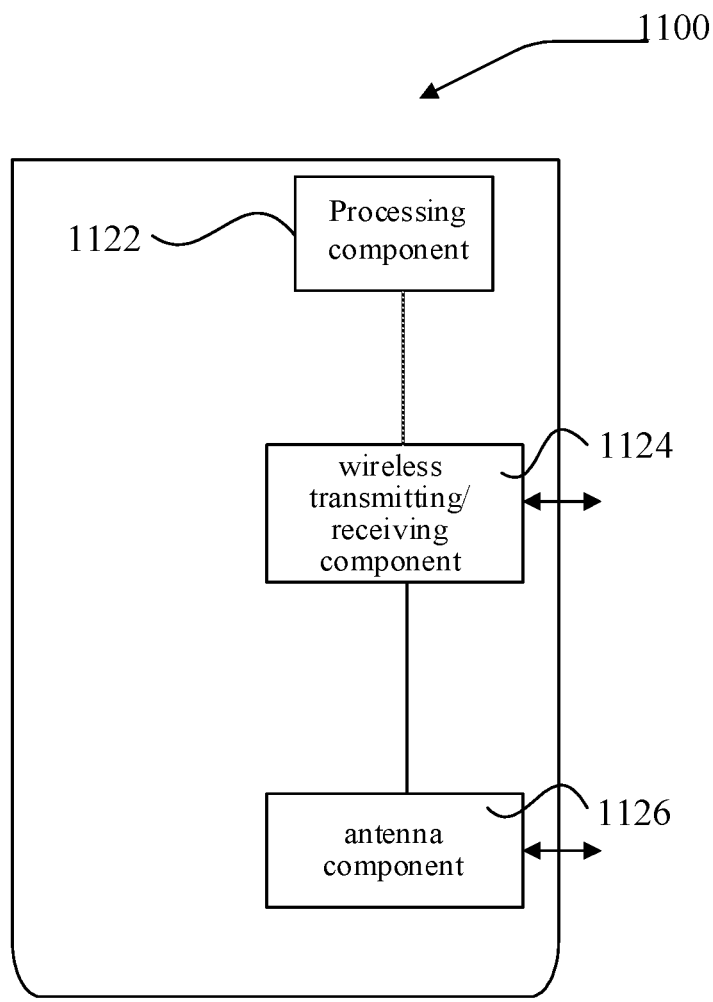
FIG. 11 is a block diagram illustrating a device suitable for indicating a position of a cell-defining SSB according to an example.

FIG. 11 is a block diagram illustrating a device suitable for indicating a position of a cell-defining SSB according to an example. The device 1100 may be provided as a base station. As shown in FIG. 11, the device 1100 includes a processing component 1122, a wireless transmitting/receiving component 1124, an antenna component 1126, and a signal processing part unique to a wireless interface. The processing component 1122 may further include one or more processors.

One of the processors in the processing component 1122 may be configured to: acquire on-off indication information set in a PBCH of a non-cell-defining SSB, where the on-off indication information is a first value or a second value; set, in response to that the on-off indication information is the first value, SSB position indication information in the PBCH to indicate a position of a raster or a raster group in which a cell-defining SSB is located; set, in response to that the on-off indication information is the second value, gap indication information in the PBCH to indicate that there is no cell-defining SSB within a range of a current frequency band, where the range has a length of a gap value and is centered at a position of the current SSB position; and send the SSB to UE.

In an example, there is also provided a non-transitory computer-readable storage medium including instructions. The instructions can be executed by the processing component 1122 of the device 1100 to perform the above methods of indicating a position of a cell-defining SSB. For example, the non-transitory computer-readable storage medium may be a Read-Only Memory (ROM), a Random Access Memory (RAM), CD-ROM, a magnetic tape, a floppy disk, an optical data storage device, and the like.

Figure 12:
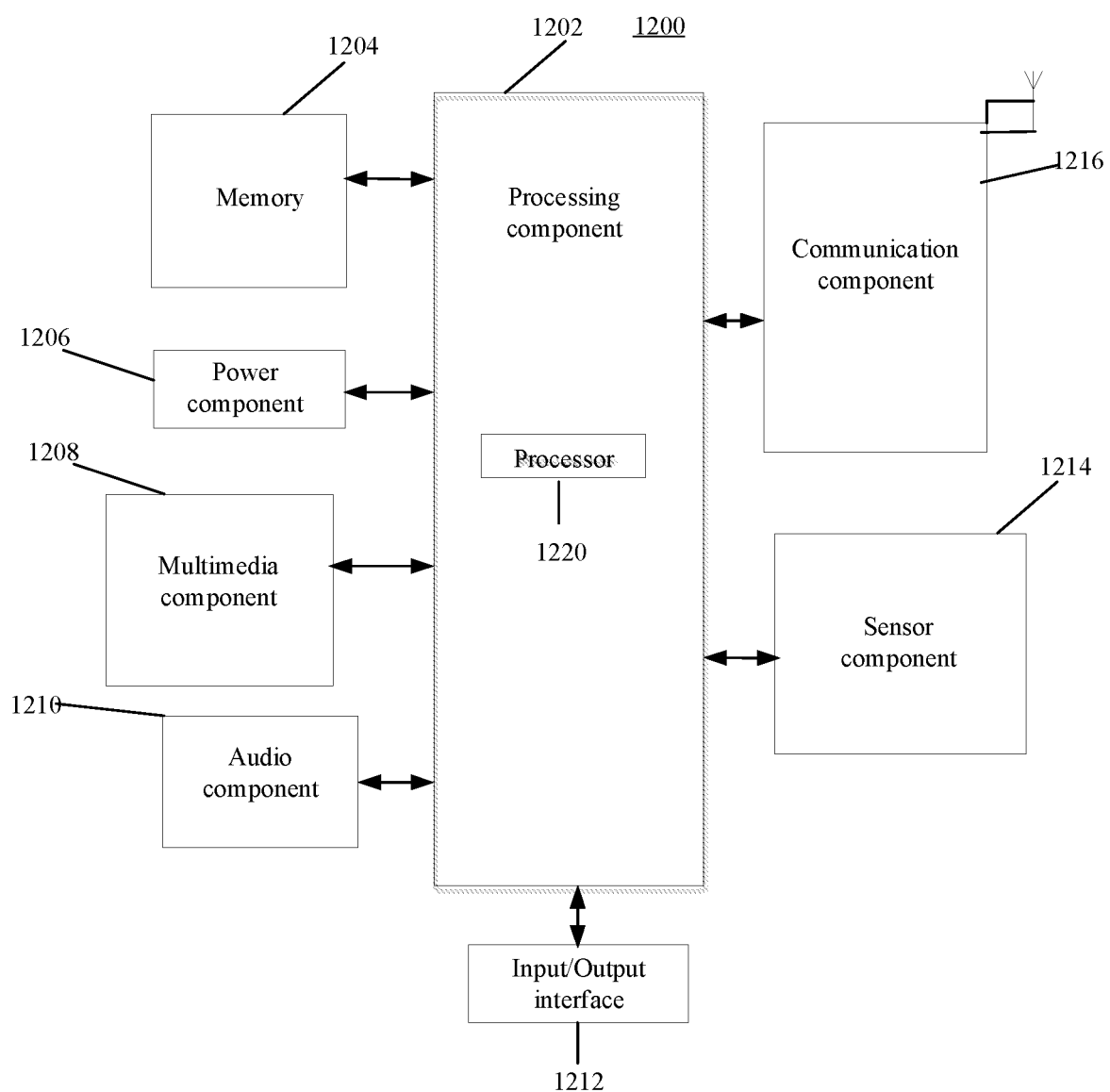
FIG. 12 is a block diagram illustrating a device suitable for searching for a position of a cell-defining SSB according to an example.

FIG. 12 is a block diagram illustrating a device suitable for searching for a position of a cell-defining SSB according to an example. For example, a device 1200 may be a mobile phone, a computer, a digital broadcast terminal, a message receiving and transmitting device, a game console, a tablet device, a medical device, a fitness device, a personal digital assistant, and other user equipment.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 generally controls the overall operation of the device 1200, such as operations associated with display, telephone calls, data communications, camera operations, and recording operations. The processing component 1202 may include one or more processors 1220 to execute instructions to complete all or part of the steps of the above methods. Moreover, processing component 1202 can include one or more modules to facilitate interaction between the processing component 1202 and other components. For example, the processing component 1202 may include a multimedia module to facilitate the interaction between the multimedia component 1208 and the processing component 1202.

One of the processors 1220 of the processing component 1202 may be configured to: receive an SSB sent by a base station; parse the SSB; read, in response to that on-off indication information parsed from a PBCH of the SSB is a first value, SSB position indication information and search for a position of a cell-defining SSB based on the SSB position indication information; and read, in response to that the on-off indication information parsed from the PBCH of the SSB is a second value, gap indication information and search for the position of the cell-defining SSB by skipping a range of a current frequency band indicated by the gap indication information, where the range has a length of a gap value and is centered at a position of the current SSB.

The memory 1204 is configured to store various types of data to support the operation of the device 1200. Examples of such data include instructions for any application or method operating on the device 1200, contact data, phone book data, messages, pictures, videos, and the like. The memory 1204 can be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

The power component 1206 provides power to different components of the device 1200. The power component 1206 may include a power management system, one or more power supplies, and other components associated with generating, managing, and distributing power for the device 1200.

The multimedia component 1208 includes a screen providing an output interface between the device 1200 and a user. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensors may not only sense a boundary of a touch or swipe, but also sense a duration and a pressure associated with the touch or swipe. In some examples, the multimedia component 1208 includes a front camera and/or a rear camera. The front camera and/or rear camera may receive external multimedia data when the device 1200 is in an operating mode, such as a photographing mode or a video mode. Each front and rear camera can be a fixed optical lens system or have focal length and optical zooming capabilities.

The audio component 1210 is configured to output and/or input an audio signal. For example, audio component 1210 includes a microphone (MIC) that is configured to receive an external audio signal when the device 1200 is in an operational mode, such as a call mode, a recording mode, and a voice recognition mode. The received audio signal may be further stored in memory 1204 or transmitted via communication component 1216. In some examples, the audio component 1210 also includes a speaker for outputting an audio signal.

The I/O interface 1212 may provide interfaces between the processing component 1202 and peripheral interface modules. The peripheral interface modules may include a keyboard, a click wheel, buttons and the like. These buttons may include, but are not limited to, a home button, a volume button, a start button, and a lock button.

The sensor component 1214 includes one or more sensors for providing the device 1200 with a status assessment of various aspects. For example, the sensor component 1214 may detect the on/off status of the device 1200, and relative positioning of component, for example, the component is a display and a keypad of the device 1200. The sensor component 1214 may also detect a change in position of the device 1200 or a component of the device 1200, a presence or absence of the contact between a user and the device 1200, an orientation or an acceleration/deceleration of the device 1200, and a change in temperature of the device 1200. The sensor component 1214 can include a proximity sensor configured to detect the presence of nearby objects without any physical contact. The sensor component 1214 may also include a light sensor, such as a CMOS or CCD image sensor, for use in imaging applications. In some examples, the sensor component 1214 can also include an acceleration sensor, a gyro sensor, a magnetic sensor, a pressure sensor, or a temperature sensor.

The communication component 1216 is configured to facilitate wired or wireless communication between the device 1200 and other devices. The device 1200 can access a wireless network based on a communication standard, such as WiFi, 2G or 3G, or a combination thereof. In an example, the communication component 1216 receives a broadcast signal or broadcast-associated information from an external broadcast management system via a broadcast channel. In an example, the communication component 1216 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In an example, the device 1200 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is also provided a non-transitory computer-readable storage medium including instructions, such as the memory 1204 including instructions. The above instructions may be executed by the processor 1220 of the device 1200 to complete the above methods. For example, the non-transitory computer-readable storage medium may be a ROM, a random access memory (RAM), a CD-ROM, a magnetic tape, a floppy disk, and an optical data storage device.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementations of the present disclosure will be readily apparent to those skilled in the art after implementing the disclosure by referring to the specification. The present application is intended to cover any variations, uses, or adaptations of the present disclosure, which are in accordance with the general principles of the present disclosure and include common general knowledge or conventional technical means in the art that are not disclosed in the present disclosure. The specification and examples therein are only illustrative, and the scope and spirit of the disclosure are to be indicated by appended claims.

It is to be understood that this disclosure is not limited to the above described accurate structures shown in the drawings, and various changes and modifications can be made to the disclosure without departing from the scope thereof. The scope of the disclosure is to be limited only by the appended claims.

The invention claimed is:

1. A method of indicating a position of a cell-defining synchronization signal block (SSB), the method comprising:
   acquiring, by a base station, on-off indication information set in a physical broadcast channel (PBCH) of a non-cell-defining SSB, wherein the on-off indication information is a first value or a second value configured to distinguish between a first scenario in which two frequency bands of a first operator are not separated by one frequency band of a second operator and a second scenario in which two frequency bands of the first operator are separated by one frequency band of the second operator;
   setting, by the base station and in response to that the on-off indication information is the first value, SSB position indication information in the PBCH to indicate a position of a raster or a raster group in which a cell-defining SSB is located;
   setting, by the base station and in response to that the on-off indication information is the second value, gap indication information in the PBCH to indicate that there is no cell-defining SSB within a range of a current frequency band, wherein the range has a length of a gap value and is centered at a position of the current SSB; and
   sending, by the base station, the SSB to user equipment (UE).

2. The method of claim 1, wherein setting the SSB position indication information in the PBCH comprises:
   selecting, by the base station, a first number of bits from a first preset number of bits of the PBCH;
   selecting, by the base station, a second number of frequency offset reserved bits from a second preset number of frequency offset reserved bits of the PBCH; and
   setting, by the base station, the SSB position indication information with the first number of bits and the second number of frequency offset reserved bits.

3. The method of claim 1, wherein setting the gap indication information in the PBCH comprises:
   selecting, by the base station, a third number of bits from a first preset number of bits of the PBCH;
   selecting, by the base station, a fourth number of frequency offset reserved bits from a second preset number of frequency offset reserved bits of the PBCH; and
   setting, by the base station, the gap value with the third number of bits and the fourth number of frequency offset reserved bits.

4. The method of claim 1, further comprising:
   grouping, by the base station, SSBs.

5. The method of claim 1, further comprising:
   resetting, by the base station, a content of subcarrier spacing (SCS) information of remaining minimum system information (RMSI) in the PBCH to indicate an SCS of the cell-defining SSB.

6. A method of searching for a position of a cell-defining synchronization signal block (SSB), the method comprising:
   receiving, by user equipment (UE), an SSB sent by a base station;
   parsing, by the UE, the SSB;
   reading, by the UE and in response to that on-off indication information parsed from a PBCH of the SSB is a first value, SSB position indication information and searching for, by the UE, a position of a cell-defining SSB based on the SSB position indication information; and
   reading, by the UE and in response to that the on-off indication information parsed from the PBCH of the SSB is a second value, gap indication information and searching for, by the UE, the position of the cell-defining SSB by skipping a range of a current frequency band indicated by the gap indication information, wherein the range has a length of a gap value and is centered at a position of the current SSB;
   wherein the on-off indication information is configured to distinguish between a first scenario in which two frequency bands of a first operator are not separated by one frequency band of a second operator and a second scenario in which two frequency bands of the first operator are separated by one frequency band of the second operator.

7. The method of claim 6, wherein reading the SSB position indication information comprises:
   reading, by the UE, the SSB position indication information from a first number of bits and a second number of frequency offset reserved bits of the PBCH.

8. The method of claim 6, wherein reading the gap indication information comprises:
   reading, by the UE, the gap indication information from a third number of bits and a fourth number of frequency offset reserved bits of the PBCH.

9. The method of claim 6, wherein searching for the position of the cell-defining SSB based on the SSB position indication information comprises:
searching, by the UE and based on a position of a raster or a raster group in which the cell-defining SSB is located, a preset range for the position of the cell-defining SSB.

10. The method of claim 9, further comprising:
grouping, by the UE, SSBs.

11. The method of claim 6, further comprising:
determining, by the UE and in response to that reset SCS information of remaining minimum system information (RMSI) is parsed from the PBCH of the SSB, an SCS of the cell-defining SSB based on the reset SCS information of the RMSI, wherein the reset SCS information of the RMSI indicates the SCS of the cell-defining SSB.

12. A base station for implementing the method of claim 1, comprising:
at least one processor; and
a memory for storing executable instructions by the at least one processor;
wherein the at least one processor is configured to:
acquire on-off indication information set in a physical broadcast channel (PBCH) of a non-cell-defining SSB, wherein the on-off indication information is a first value or a second value configured to distinguish between a first scenario in which two frequency bands of a first operator are not separated by one frequency band of a second operator and a second scenario in which two frequency bands of the first operator are separated by one frequency band of the second operator;
set, in response to that the on-off indication information is the first value, SSB position indication information in the PBCH to indicate a position of a raster or a raster group in which a cell-defining SSB is located;
set, in response to that the on-off indication information is the second value, gap indication information in the PBCH to indicate that there is no cell-defining SSB within a range of a current frequency band, wherein the range has a length of a gap value and is centered at a position of the current SSB; and
send the SSB to user equipment (UE).

13. The base station of claim 12, wherein the at least one processor is further configured to group SSBs.

14. The base station of claim 12, wherein the at least one processor is further configured to:
reset a content of subcarrier spacing (SCS) information of remaining minimum system information (RMSI) in the PBCH to indicate an SCS of the cell-defining SSB.

15. User equipment, comprising:
at least one processor; and
a memory for storing executable instructions by the at least one processor;
wherein the at least one processor is configured to:
receive an SSB sent by a base station;
parse the SSB;
read, in response to that on-off indication information parsed from a PBCH of the SSB is a first value, SSB position indication information and
search for a position of a cell-defining SSB based on the SSB position indication information; and
read, in response to that the on-off indication information parsed from the PBCH of the SSB is a second value, gap indication information and
search for the position of the cell-defining SSB by skipping a range of a current frequency band indicated by the gap indication information, wherein the range has a length of a gap value and is centered at a position of the current SSB;
wherein the on-off indication information is configured to distinguish between a first scenario in which two frequency bands of a first operator are not separated by one frequency band of a second operator and a second scenario in which two frequency bands of the first operator are separated by one frequency band of the second operator.

16. The user equipment of claim 15, wherein when reading the SSB position indication information, the processor is configured to:
read the SSB position indication information from a first number of bits and a second number of frequency offset reserved bits of the PBCH.

17. The user equipment of claim 15, wherein when reading the gap indication information, the processor is configured to:
read the gap indication information from a third number of bits and a fourth number of frequency offset reserved bits of the PBCH.

18. The user equipment of claim 15, wherein when search for the position of the cell-defining SSB based on the SSB position indication information, the processor is configured to:
search, based on a position of a raster or a raster group in which the cell-defining SSB is located, a preset range for the position of the cell-defining SSB.

19. The user equipment of claim 18, wherein the at least one processor is further configured to group SSBs.

20. The user equipment of claim 15, wherein the at least one processor is further configured to:
determine, in response to that reset SCS information of remaining minimum system information (RMSI) is parsed from the PBCH of the SSB, an SCS of the cell-defining SSB based on the reset SCS information of the RMSI, wherein the reset SCS information of the RMSI indicates the SCS of the cell-defining SSB.

* * * * *